US008070187B2

(12) United States Patent
Athalye et al.

(10) Patent No.: US 8,070,187 B2

(45) Date of Patent: Dec. 6, 2011

(54) INTERFACE HOSE SEAL FOR LOW PERMEATION FLANGE OF A FUEL SUPPLY UNIT

(75) Inventors: Parag Athalye, Auburn Hills, MI (US); Matthias Nederegger, Rochester Hills, MI (US); Stephane Seps, Detroit, MI (US); John Patrick Wattai, Rochester Hills, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 153 days.

(21) Appl. No.: 11/889,473

(22) Filed: Aug. 14, 2007

(65) Prior Publication Data

US 2008/0042436 A1 Feb. 21, 2008

Related U.S. Application Data

(60) Provisional application No. 60/839,342, filed on Aug. 21, 2006.

(51) Int. Cl.
*F16L 33/00* (2006.01)
*F16L 47/28* (2006.01)

(52) U.S. Cl. .......................................... 285/239; 285/55

(58) Field of Classification Search .................. 264/104, 264/259, 274, 279, 279.1; 522/468; 285/55, 285/242, 239, 257, 222

See application file for complete search history.

(56) References Cited

U.S. PATENT DOCUMENTS

| | | | | |
|---|---|---|---|---|
| 470,531 | A * | 3/1892 | Aims, Jr. | 285/305 |
| 4,391,741 | A * | 7/1983 | Masamoto et al. | 252/511 |
| 5,799,986 | A * | 9/1998 | Corbett et al. | 285/55 |
| 6,254,820 | B1 * | 7/2001 | Cornell | 264/446 |
| 6,379,200 | B1 | 4/2002 | Hartke et al. | |
| 6,402,205 | B1 * | 6/2002 | Rose et al. | 285/319 |
| 6,439,620 | B1 * | 8/2002 | Guest | 285/347 |
| 6,672,287 | B2 * | 1/2004 | Wada et al. | 123/468 |
| 6,722,708 | B2 * | 4/2004 | Morohoshi et al. | 285/423 |
| 6,755,206 | B2 * | 6/2004 | Nishi et al. | 137/202 |

(Continued)

FOREIGN PATENT DOCUMENTS

DE 19547876 A1 6/1997

OTHER PUBLICATIONS

Co-pending U.S. Appl. No. 11/889,468, filed Aug. 14, 2007 of Athalye et al.

(Continued)

*Primary Examiner* — James Hewitt

(57) ABSTRACT

A flange structure (10) is provided for a fuel supply unit of a vehicle. The flange structure includes at least one electrically conductive fuel port (16') having a periphery and first and second ends (22, 23). The first end (22) includes first barb structure (28). A plastic flange (20') is overmolded on at least a portion of the periphery of the fuel port between the first and second ends. A portion of the flange overmolded on the portion of the periphery of the fuel port defines fitting structure (25) having second barb structure (27). A hose (30) is coupled with the first end of the fuel port and with the fitting structure with the first and second barb structures engaging the hose thereby preventing fuel or fuel vapor from passing between the periphery of the fuel port and the overmolded flange.

16 Claims, 2 Drawing Sheets

U.S. PATENT DOCUMENTS

| | | | | |
|---|---|---|---|---|
| 6,790,385 | B2 * | 9/2004 | Schleith et al. | 252/511 |
| 7,577,378 | B2 * | 8/2009 | Matsui | 399/115 |
| 2002/0121517 | A1 * | 9/2002 | Aoki et al. | 220/4.14 |
| 2003/0131828 | A1 | 7/2003 | Crary | |
| 2004/0051305 | A1 * | 3/2004 | Kertesz | 285/21.1 |
| 2005/0029809 | A1 * | 2/2005 | Kaneko | 285/288.1 |
| 2005/0121913 | A1 * | 6/2005 | Smahl | 285/423 |
| 2005/0184515 | A1 * | 8/2005 | Isayama et al. | 285/288.1 |
| 2006/0130926 | A1 | 6/2006 | Riegel et al. | |
| 2006/0185760 | A1 * | 8/2006 | Matsuzaki et al. | 141/286 |

OTHER PUBLICATIONS

Co-pending U.S. Appl. No. 11/826,280, filed Jul. 13, 2007 of Athalye et al.

Co-pending U.S. Appl. No. 11/889,474, filed Aug. 14, 2007 of Athalye et al.

Co-pending U.S. Appl. No. 11/822,649, filed Jul. 9, 2007 of Athalye.

Co-pending U.S. Appl. No. 11/889,472, filed Aug. 14, 2007 of Athalye et al.

* cited by examiner

INTERFACE HOSE SEAL FOR LOW PERMEATION FLANGE OF A FUEL SUPPLY UNIT

This application claims the benefit of the earlier filing date of U.S. Provisional Application No. 60/839,342, filed on Aug. 21, 2006, which is hereby incorporated by reference into this specification.

FIELD OF THE INVENTION

The invention relates to fuel supply units for automobile vehicles and, more particularly, to providing a permeation barrier between a conductive fuel port and a non-conductive flange.

BACKGROUND OF THE INVENTION

With reference to FIG. 1, a typical fuel supply unit for a vehicle includes flange structure, generally indicated at 10 including a plastic flange 20 configured to be sealed to a wall of a fuel tank. The flange structure 10 is interconnected with a fuel pump assembly 12 by a pair of metal struts 14. The flange structure 10 also includes various ports 16 that provide pathways into and out of the fuel tank for fuel. The ports 16 are connected with the fuel pump 12 to supply fuel to an engine, but the connecting hoses are not shown in FIG. 1.

Recently, there has been a greater focus on Electro Static Dissipation (ESD) in such fuel supply systems. It is known that as fuel flows through various components of the fuel supply system, such as the fuel pump assembly, the fuel filter, and various valving and tubing, there is the potential for static electricity to be generated in the various conductive components of the fuel supply system. To dissipate this static electricity, fuel supply systems electrically ground the components through electrical interconnection.

For example, as shown in FIG. 1, some systems employ a separate cable harness 18 which grounds through the pump negative. Other systems employ grounding clips (not shown) that touch an inline filter. In addition, conductive portions of fuel ports have been grounded.

There is a need provide for ESD of fuel ports while creating a barrier to prevent permeation or leakage of fuel around the fuel port.

SUMMARY OF THE INVENTION

An object of the invention is to fulfill the need referred to above. In accordance with the principles of the present invention, this objective is obtained by providing a flange structure for a fuel supply unit of a vehicle. The flange structure includes at least one electrically conductive fuel port having a periphery and first and second ends. The first end includes first barb structure. A plastic flange is overmolded on at least a portion of the periphery of the fuel port between the first and second ends. The flange is constructed and arranged to be coupled with a fuel tank of a vehicle. A portion of the flange overmolded on the portion of the periphery of the fuel port defines fitting structure having second barb structure. A hose is coupled with the first end of the fuel port and with the fitting structure with the first and second barb structures engaging the hose thereby by preventing fuel or fuel vapor from passing between the periphery of the fuel port and the overmolded flange.

In accordance with another aspect of the disclosed embodiment, a method of providing a flange structure for a fuel supply unit of a vehicle provides at least one electrically conductive fuel port having a periphery and first and second ends. First barb structure is provided on the first end. A plastic flange is overmolded on at least a portion of the periphery of the fuel port between the first and second ends. A portion of the flange overmolded on the portion of the periphery of the fuel port defines fitting structure having second barb structure. The method also includes coupling a hose to the first end of the fuel port and to the fitting structure with the first and second barb structures engaging the hose. Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
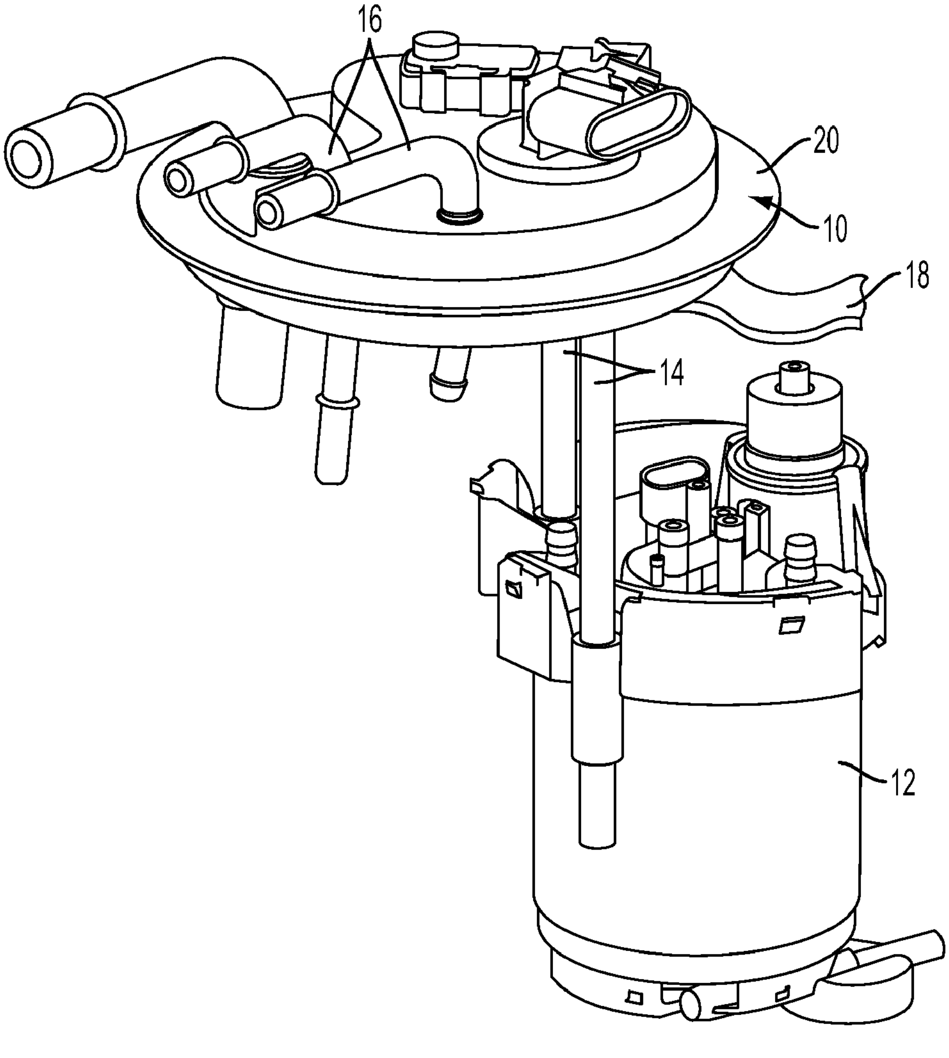
FIG. 1 PRIOR ART
FIG. 1 is a view of conventional fuel supply unit of a vehicle.
Figure 2:
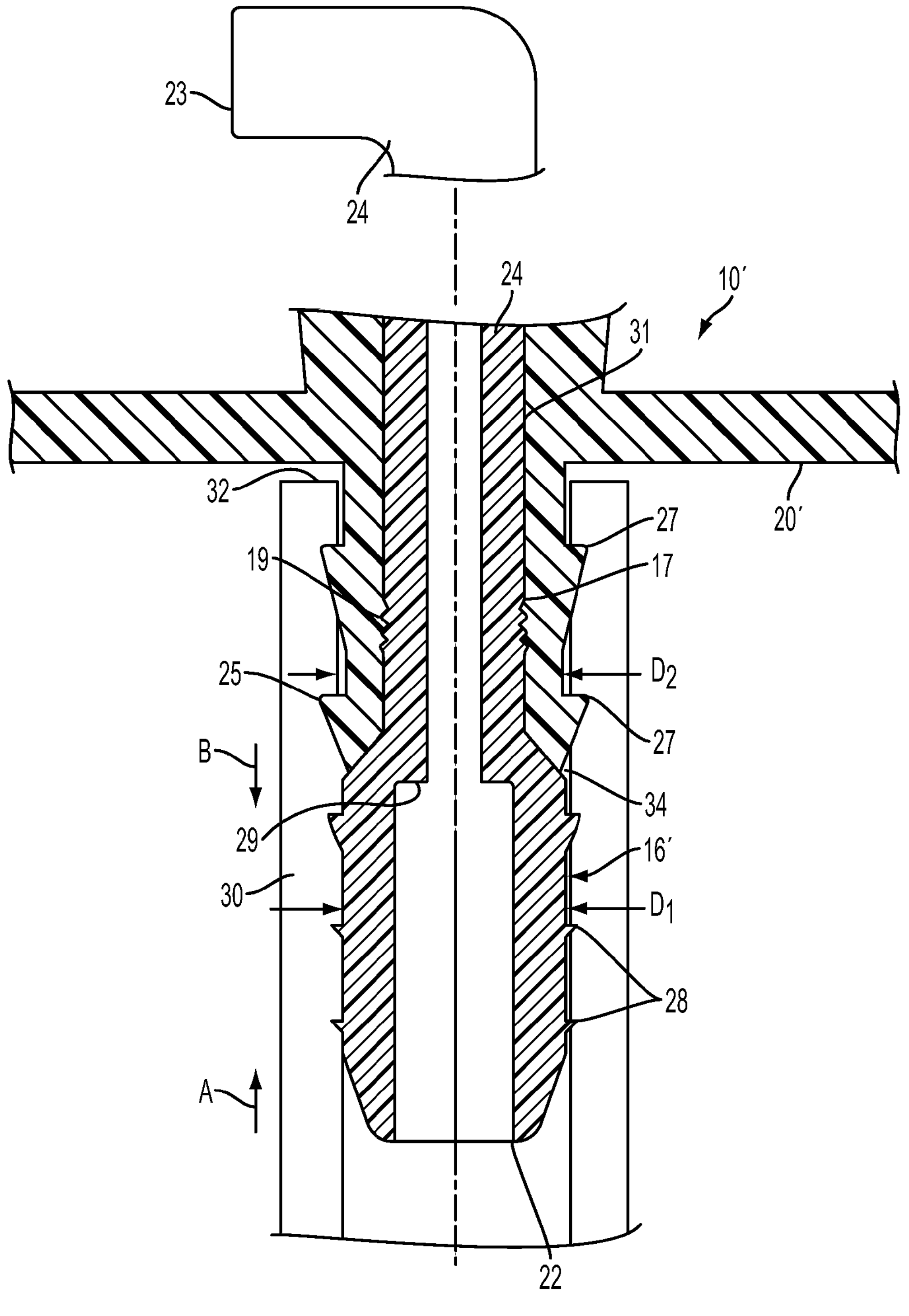
FIG. 2 is a partial sectional view of a flange structure including a flange, a fuel port and a hose provided in accordance with an embodiment of the invention.

With reference to FIG. 2, a portion of a flange structure, generally indicated at 10', is shown in accordance with the principles of an embodiment of the invention. The flange structure 10' is similar to the flange structure 10 shown in FIG. 1, employed in a fuel supply unit of a vehicle. The flange structure 10' includes a fuel port, generally indicted at 16' and a flange, generally indicated at 20', overmolded on at least a portion of the fuel port 16'. In the embodiment, a periphery 17 of the fuel port 16' includes surface features such as scallops or wave-like features 19 that engage with the overmolded flange 20' to ensure a good connection between the flange 20' and fuel port 16'.

The fuel port 16' is electrically conductive, preferably a pre-molded plastic structure such as conductive Polyoxymethylene (POM). The fuel port 16' has a first end 22 accessible inside a fuel tank (not shown) and a second end 23, extending from portion 24, that is accessible outside of the flange 20' and thus outside of the fuel tank. As noted above, a portion of the periphery 17 of the fuel port 16' between the first and second ends is overmolded with the non-conductive plastic flange 20'. A portion of the overmolded flange 20' defines fitting structure 25 having barb structure preferably in the form of two annular barbs 27 disposed in spaced relation. One or more barbs 27 can be used. In the embodiment, the inside diameter of the fuel port 16' includes a step 29 defining a reduced outside diameter portion 31 of the fuel port 16. The wall thickness of the fuel port 16' is thus substantially constant. Hence, when the fitting structure 25 is overmolded on portion 31, an outside diameter $D_2$ of the fitting structure 25 is substantially equal to the outside diameter $D_1$ of the end 22 of the fuel port 16' so that the end 22 and fitting structure 25 can receive a hose 30, as will be explained below.

The flange 20' is constructed and arranged to be sealed to a wall of a fuel tank. Thus, as noted above, the second end 23 of the fuel port 16' is accessible outside of the flange 20' and is constructed and arranged to be connected at the engine side of a vehicle. The first end 22 of the fuel port 16' is associated with the inside of the flange 20' and thus is to be exposed to fuel in the fuel tank. The first end 22 of the fuel port 16' preferably is a male end that includes annular barb structure 28 so as engage an inner surface of the hose 30 that is connected to a fuel pump (not shown in FIG. 2), preferably of the type shown in FIG. 1. The inner surface of the hose 30 also engages the barb structure 27 of the fitting structure 25, the function of which will be explained below.

In the embodiment, the barb structure 28 includes three annular barbs, disposed in spaced relation, providing a 360 degree hydraulic seal about the fuel port 16' and hose 30 interface. The barb structure 28 can include one or more barbs. The hose 30 is preferably of uniform diameter and electrically conductive to provide a ground to a fuel filter and/or the fuel pump. Thus, electrostatic energy caused by fuel flowing through the fuel port 16' and the hose 30 can be dissipated by grounding at the fuel pump or fuel filter. Alternatively, the fuel port 16' can be grounded at the engine side.

Since the first end 22 of the fuel port 16' is exposed to fuel in hose 30 and fuel is exposed to end 32 of the hose 30, there is a chance of leakage or permeation of fuel or fuel vapors between the periphery 17 of the fuel port 16' and the overmolded flange 20'. For example, there is a chance of fuel entering at location 34 in FIG. 2 between these two components. In accordance with the embodiment, the annular barb structure 28 engaging the hose 30 prevents fuel or vapors from reaching location 34 from the direction A of FIG. 2, and the annular barb structure 27 of the fitting structure 25 engaging the hose 30 prevents fuel or vapors from reaching location 34 from the direction B. Thus, the permeation of fuel is prevented between the periphery 17 of the fuel port 16' and the overmolded flange 20'. The barb structures 27 and 28, not only define sealing means, but also are constructed and arranged so that removal of the hose 30 in the direction B in FIG. 2 is difficult.

Although only one fuel port 16' is shown in FIG. 2, it can be appreciated that other similar ports, with the associated connection with the flange 20' and hose 30 can be provided.

Hence, by employing a conductive fuel port 16', ESD can be achieved and by providing the barbs 27 and 28, a fuel leakage barrier is provided. Another advantage of the embodiment is that the parting line or transition between electrically conductive and non-conductive material is not pressurized. This eliminates issues regarding material differences for thermal behavior and mechanical force. The hose 30 seals to the barbs and leaves a pressure free transition.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A flange structure for a fuel supply unit of a vehicle, the flange structure comprising:

at least one electrically conductive fuel port having an inner periphery, an outer periphery, and first and second ends, the first end including first barb structure, the inner periphery being constructed and arranged to contact fuel such that electrostatic energy caused by fuel flowing through the fuel port can be dissipated by grounding due to the conductive fuel port, the second end being a generally cylindrical tube constructed and arranged to be accessible to be connected at an engine side of a vehicle, a non-electrically conductive plastic flange overmolded on at least a portion of the outer periphery of the fuel port between the first and second ends such that both the first and second ends of the fuel port have no outer periphery covered by the overmolded flange, the flange having a first surface and an opposing second surface such that the first surface is constructed and arranged to be exposed to an interior of a fuel tank of a vehicle with the second end of the fuel port being accessible outside of the second surface of the flange and at an exterior of the fuel tank and the first end of the fuel port being generally adjacent to the first surface of the flange and constructed and arranged to extend into the interior of the fuel tank, a portion of the flange overmolded on the portion of the outer periphery of the fuel port near the first end being constructed and arranged to extend into the interior of the fuel tank and defining fitting structure having second barb structure, and a hose coupled with the first end of the fuel port and with the fitting structure with the first and second barb structures engaging the hose thereby preventing fuel or fuel vapor from passing between the periphery of the fuel port and the overmolded flange.

2. The flange structure of claim 1, wherein the fuel port is composed of electrically conductive plastic.

3. The flange structure of claim 1, wherein at least a portion of the outer periphery of the fuel port includes surface features that engage with the overmolded flange.

4. The flange structure of claim 3, wherein the surface features include a plurality alternating peak and valley features.

5. The flange structure of claim 1, wherein the first barb structure includes at least one annular barb.

6. The flange structure of claim 5, wherein the second barb structure includes at least one annular barb.

7. The flange structure of claim 1, wherein the fuel port has a reduced outside diameter portion as compared to a diameter of the first end thereof, the fitting structure being overmolded on the reduced diameter portion such that an outside diameter of the fitting structure is substantially equal to an outside diameter of the first end of the fuel port.

8. The flange structure of claim 7, wherein the first barb structure is on the outside periphery of the first end of the fuel port and the second barb structure is on the outside periphery of the fitting structure.

9. A flange structure for a fuel supply unit of a vehicle, the flange structure comprising:

at least one electrically conductive fuel port having an inner periphery, an outer periphery, and first and second ends, the first end including first means for sealing, the inner periphery being constructed and arranged to contact fuel such that electrostatic energy caused by fuel flowing through the fuel port can be dissipated by grounding due to the conductive fuel port, the second end being a generally cylindrical tube constructed and arranged to be accessible to be connected at an engine side of a vehicle, a non-electrically conductive plastic flange overmolded on at least a portion of the outer periphery of the fuel port between the first and second ends such that both the first and second ends of the fuel port have no outer periphery covered by the overmolded flange, the flange having a first surface and an opposing second surface such that the first surface is constructed and arranged to be exposed to an interior of a fuel tank of a vehicle with the second end of the fuel port being accessible outside of the second surface of the flange and at an exterior of the fuel tank and the first end of the fuel port being generally adjacent to of the first surface of the flange and constructed and arranged to extend into the interior of the fuel tank, a portion of the flange overmolded on the portion of the periphery of the fuel port near the first end being constructed and arranged to extend into the interior of the fuel tank and defining fitting structure having second means for sealing, and a hose coupled with the first end of the fuel port and with the fitting structure with the first and second means for sealing providing a seal with respect to the hose thereby preventing fuel or fuel vapor from passing between the periphery of the fuel port and the flange.

10. The flange structure of claim 9, wherein the fuel port is composed of electrically conductive plastic.

11. The flange structure of claim 9, wherein at least a portion of the outer periphery of the fuel port includes surface features that engage with the overmolded flange.

12. The flange structure of claim 11, wherein the surface features include a plurality of alternating peak and valley features.

13. The flange structure of claim 9, wherein the first means for sealing includes at least one annular barb engaging an inner surface of the hose.

14. The flange structure of claim 13, wherein the second means for sealing includes at least one annular barbs engaging an inner surface of the hose.

15. The flange structure of claim 9, wherein the fuel port has a reduced outside diameter portion as compared to a diameter of the first end thereof, the fitting structure being overmolded on the reduced diameter portion such that an outside diameter of the fitting structure is substantially equal to an outside diameter of the first end of the fuel port.

16. The flange structure of claim 15, wherein the first means for sealing is barb structure on the outside periphery of the first end of the fuel port engaging an inner surface of the hose and the second means for sealing is barb structure on the outside periphery of the fitting structure engaging an inner surface of the hose.

* * * * *